United States Patent
Durris et al.

(10) Patent No.: US 9,271,608 B2
(45) Date of Patent: Mar. 1, 2016

(54) CONTAINER FOR ELECTRICAL HOUSEHOLD FOOD PREPARATION APPLIANCE COMPRISING A LOWER TRANSMISSION COMPONENT

(75) Inventors: Cyril Durris, Montignac (FR); Marc Suberbie, Momeres (FR)

(73) Assignee: SEB S.A., Ecully (FR)

(*) Notice: Subject to any disclaimer, the term of this patent is extended or adjusted under 35 U.S.C. 154(b) by 1353 days.

(21) Appl. No.: 12/740,361

(22) PCT Filed: Nov. 18, 2008

(86) PCT No.: PCT/FR2008/001615
§ 371 (c)(1),
(2), (4) Date: Aug. 6, 2010

(87) PCT Pub. No.: WO2009/098380
PCT Pub. Date: Aug. 13, 2009

(65) Prior Publication Data
US 2010/0294142 A1 Nov. 25, 2010

(30) Foreign Application Priority Data

Nov. 19, 2007 (FR) .................................... 07 08108
May 26, 2008 (FR) .................................... 08 02822
Jun. 2, 2008 (FR) .................................... 08 03000

(51) Int. Cl.
*A47J 43/07* (2006.01)
*A47J 43/08* (2006.01)

(52) U.S. Cl.
CPC ............ *A47J 43/0716* (2013.01); *A47J 43/085* (2013.01)

(58) Field of Classification Search
CPC ........................................................ A47J 43/07
USPC .................... 366/199, 197, 205; 99/510, 512; 241/92, 282.1
See application file for complete search history.

(56) References Cited

U.S. PATENT DOCUMENTS 4,303,282 A * 12/1981 Maher ........................... 384/129
5,297,475 A * 3/1994 Borger et al. .................... 99/348

FOREIGN PATENT DOCUMENTS

| CA | 975752 | * 10/1975 | .......................... 64/1 |
| CA | 975752 A | 10/1975 | |
| CA | 1197877 A | 12/1985 | |
| EP | 0078423 A2 | 5/1983 | |

* cited by examiner

Primary Examiner — Sally Merkling
(74) Attorney, Agent, or Firm — The Webb Law Firm

(57) ABSTRACT

A working container for electrical household food preparation appliances including a lower transmission component connected by a shaft to a rotary working tool arranged in a receptacle, wherein the shaft runs through the bottom of the receptacle and is rotatably mounted in a bearing housed in the bottom of the receptacle by virtue of the lower transmission component having an upper flange ring forming a reservoir around the shaft. The inner wall of the flange ring enables the collection of oil coming from the bearing and prevents the projection of oil onto a wall of the working container and permits the oil to drain to the bottom of the reservoir.

26 Claims, 2 Drawing Sheets

CONTAINER FOR ELECTRICAL HOUSEHOLD FOOD PREPARATION APPLIANCE COMPRISING A LOWER TRANSMISSION COMPONENT

BACKGROUND OF THE INVENTION

1. Field of the Invention

The present invention relates to the technical field of electrical household food preparation appliances comprising a working container in which turns a rotary working tool associated with a lower transmission component.

The present invention relates to working containers and appliances of the aforementioned type in which the rotary working tool and the lower transmission component are mounted on a shaft arranged in a bearing.

2. Description of Related Art

Such a construction is found in particular in the working containers of appliances of the aforementioned type generally known as blenders. In these appliances, the rotary working tool is driven at high speeds capable of exceeding 5000 rpm. A lubricated bearing is generally employed in order to prevent overheating and to ensure that the appliance works properly. A disadvantage of the designs of prior art appliances resides in the appearance of visible traces of oil in the lower portion of the working containers.

An object of the present invention is to propose a working container for electrical household food preparation appliances that remedies the aforementioned disadvantage.

Another object of the present invention is to propose an electrical household food preparation appliance comprising a working container that remedies the aforementioned disadvantage.

SUMMARY OF THE INVENTION

These objects are achieved with a working container for electrical household food preparation appliances comprising a lower transmission component connected by a shaft to a rotary working tool arranged in a receptacle, wherein the shaft runs through a bottom of the receptacle and is rotatably mounted in a bearing housed in the bottom of the receptacle by virtue of the lower transmission component having an upper flange ring forming a reservoir around the shaft. The inner wall of the flange ring enables the collection of the oil coming from the bearing and prevents the projection of oil onto a wall of the working container. The oil can then drain to the bottom of the reservoir.

The bearing is advantageously housed in a pipe. This arrangement makes it easier to mount the bearing in the bottom of the receptacle.

According to one embodiment, the bearing has a lower portion arranged in the reservoir. This arrangement in particular allows the oil centrifugally projected from the bearing to be collected on the side wall of the reservoir.

According to another embodiment, the pipe has a lower end surrounding a lower portion of the bearing, the lower end of the pipe projecting into the reservoir. This arrangement allows the oil centrifugally projected from the bearing to be collected on the inner wall of the pipe. The oil thus collected can then drop by gravity into the reservoir.

More advantageously, the bearing is made of a sintered metal material. This arrangement makes the bearing easier to lubricate.

More advantageously, the bearing rests on a washer. This arrangement enables the heating up of the lower transmission component to be reduced, which contributes to restricting the escape of the oil from between the bearing and the lower transmission component. In particular the washer can rest on the lower transmission component or on an intermediate washer disposed on the lower transmission component.

More advantageously, a seal is mounted on the shaft between the bearing and the rotary working tool. This arrangement makes it possible to restrict the escape of the oil into the working container.

Still more advantageously, the seal is a lip seal for reducing friction.

More advantageously, the reservoir has a channel. This arrangement enables a reservoir for collecting the oil to be formed.

Still more advantageously, the upper flange ring is arranged around the periphery of the channel. This arrangement enables the oil collected on the inner wall of the flange ring to flow more easily into the channel.

More advantageously, the lower transmission component has outer fins. This arrangement enables the lower transmission component to be cooled and the viscosity of the collected oil to be increased.

Still more advantageously, the outer fins are arranged around the periphery of the flange ring. This arrangement enables the efficiency of the cooling of the flange ring to be improved.

According to an advantageous embodiment, the lower transmission component has a lower drive unit. Alternately, the lower transmission component can be mounted on a lower drive unit.

These objects are also achieved with an electrical household food preparation appliance comprising a base housing a motor associated with an upper driver unit, and a working container comprising a lower transmission component connected by a shaft to a rotary working tool arranged in a receptacle, the shaft running through a bottom of the receptacle and being rotatably mounted in a bearing housed in the bottom of the receptacle, the lower transmission component being rotatably driven by the upper driver unit when the working container is disposed on the base, characterized in that the working container is configured according to at least one of the preceding characteristics.

According to an advantageous embodiment, the upper driver unit is directly driven by the motor.

According to an advantageous embodiment, the rotary working tool is rotatably driven at a speed greater than 5000 rpm.

BRIEF DESCRIPTION OF THE DRAWINGS

The invention will be better understood by studying an illustrative embodiment and a variant illustrated in the appended figures, wherein.

DETAILED DESCRIPTION OF THE INVENTION

Figure 1:
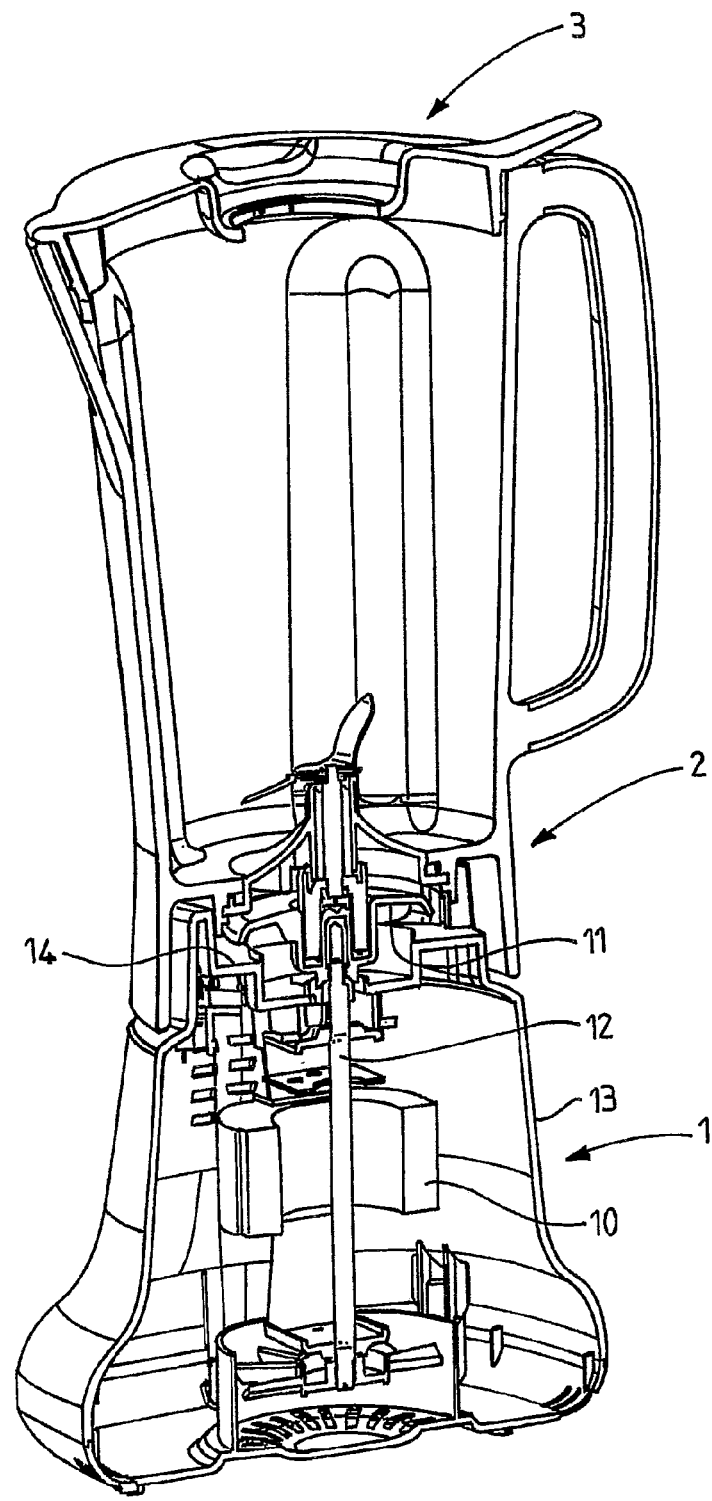
FIG. 1 is a perspective and vertical cross-sectional view of an electrical household food preparation appliance comprising a working container of the invention.
Figure 2:
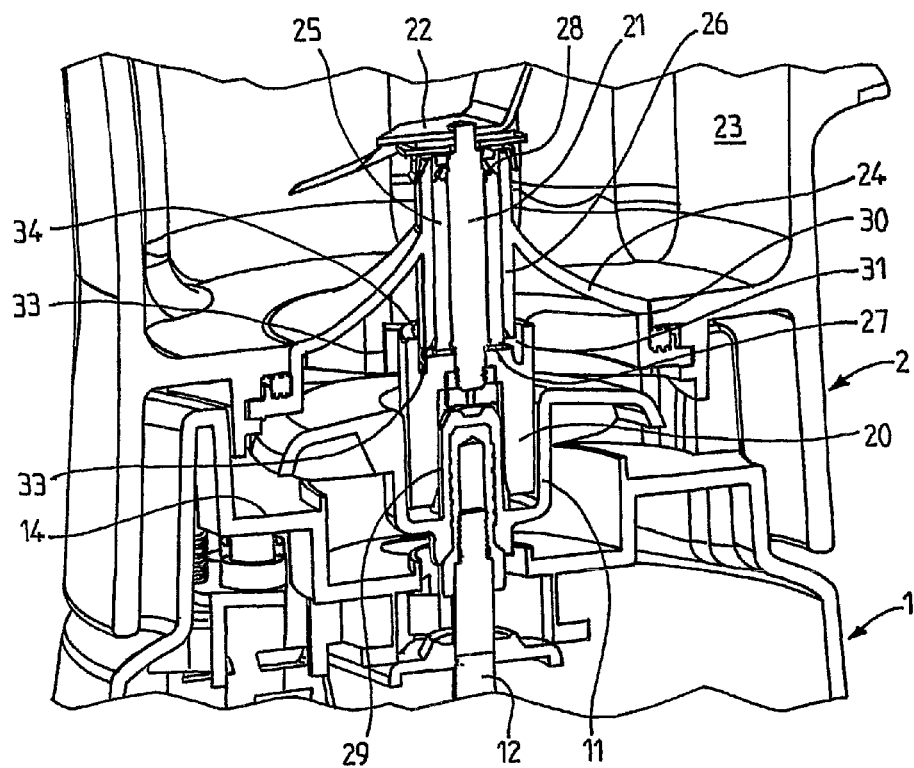
FIG. 2 is an enlarged view of a portion of FIG. 1.

The electrical household food preparation appliance illustrated in FIGS. 1 and 2 comprises a base 1 receiving a working container 2 closed by a lid 3. The base 1 houses a motor 10 associated with an upper driver unit 11, the motor 10 being diagrammatically illustrated in FIG. 1.

According to the preferred embodiment illustrated in FIG. 1, the upper driver unit 11 is mounted on a shaft 12 issuing from the motor 10. Hence the upper driver unit 11 is directly driven by the motor 10.

The base 1 comprises a housing 13 forming a pedestal 14 on which is arranged the upper driver unit 11.

As can be discerned more clearly in FIG. 2, the working container 2 for electrical household food preparation appliances comprises a lower transmission component 20 connected by a shaft 21 to a rotary working tool 22 arranged in a receptacle 23. The shaft 21 runs through a bottom 24 of the receptacle 23. The shaft 21 is rotatably mounted in a bearing 25 housed in the bottom 24.

More particularly, the bearing 25 is housed in a pipe 26. The pipe 26 extends from both sides of the bottom 24. The pipe 26 advantageously has a lower end arranged in the reservoir 31. The bearing 25 advantageously has a lower portion projecting out of the pipe 26. The bearing 25 is advantageously made of a sintered metal material. Hence the bearing 25 can be impregnated with oil.

The bearing 25 advantageously rests on a washer 27, as can be more easily discerned in FIG. 2. The washer 27 enables the heating up of the rotatably driven lower transmission component 20 to be reduced. According to an advantageous embodiment shown in the figures, the washer 27 rests on the lower transmission component 20.

A seal 28 is mounted on the shaft 21 between the bearing 25 and the rotary working tool 22. According to an advantageous embodiment illustrated in FIGS. 1 and 2, the seal 28 is a lip seal.

The lower transmission component 20 is rotatably driven by the upper driver unit 11 when the working container 2 is disposed on the base 1. According to an advantageous embodiment illustrated in the figures, the lower transmission component 20 has a lower drive unit 29 designed to cooperate with the upper driver unit 11 of the base 1.

The lower transmission component 20 has an upper flange ring 30 forming a reservoir 31 around the shaft 21. More particularly, the bearing 25 has a lower portion arranged in the reservoir 31. Hence the lower end of the bearing 25 is arranged in relation to an inner side wall 32 of the upper flange ring 30.

Figure 3:
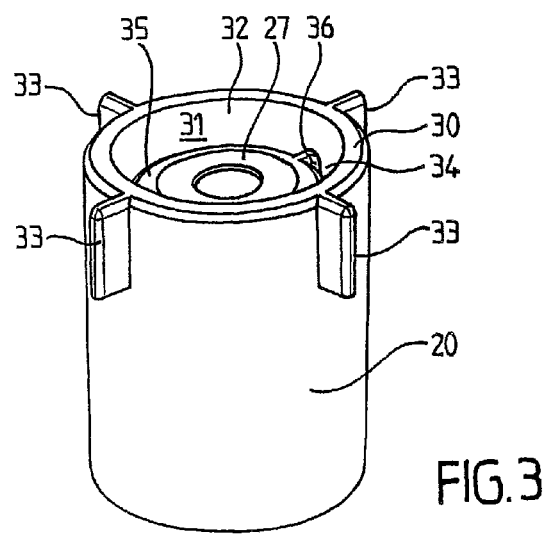
FIG. 3 is a perspective view of the driver unit of the working container illustrated in FIGS. 1 and 2.

The lower transmission component 20 has outer fins 33, which can be more easily discerned in FIG. 3. More particularly, the outer fins 33 are arranged around the periphery of the upper flange ring 30 and enable the cooling of the side wall of the reservoir 31.

As can be more easily discerned in FIG. 2, the reservoir 31 has a channel 34 formed around an upper central portion 35 of the lower transmission component 20. The upper flange ring 30 is arranged around the periphery of the channel 34. As can be more easily discerned in FIG. 3, the washer 27 is disposed on the upper central portion 35.

At least one upright 36 advantageously connects the upper central portion 35 of the lower transmission component 20 to the inner side wall 32 of the upper flange ring 30. Preference is given to at least two uprights 36, thus making it easier to cast the lower transmission component 20 and to rigidify the upper flange ring 30.

The present invention operates in the following way. When the rotary working tool is rotatably driven at a high speed, the heating up of the bearing 25 and the shaft 21 lowers the viscosity of the lubrication oil, which tends to escape from between the bearing 25 and the lower transmission component 20 and particularly from between the bearing 25 and the washer 27. The upper flange ring 30 enables the lubrication oil ejected from between the bearing 25 and the washer 27 to be caught and said oil to be collected in the reservoir 31. Hence the presence of traces of lubrication oil on the visible walls of the working container 2 can be avoided.

The present invention is particularly applicable to electrical household food preparation appliances in which the rotary working tool 22 is rotatably driven at a speed greater than 5000 rpm.

Figure 4:
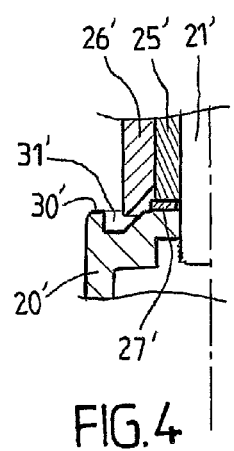
FIG. 4 is a partial schematic cross-sectional view of a variant of embodiment of a working container according to the invention.

FIG. 4 illustrates a variant of embodiment of a working container for electrical household food preparation appliances comprising a lower transmission component 20' connected by a shaft 21' to a rotary working tool arranged in a receptacle. The lower transmission component 20' has an upper flange ring 30' forming a reservoir 31' around the shaft 21'. The shaft 21' is rotatably mounted in a bearing 25' housed in the bottom of the receptacle. The bearing 25' is housed in a pipe 26'. The bearing 25' rests on a washer 27'. This variant of embodiment differs from the preceding illustrative embodiment in that the pipe 26' has a lower end surrounding a lower portion of the bearing 25; the lower end of the pipe 26' extending into the reservoir 31'. Hence the inner wall of the lower end of the pipe 26' is capable of receiving the oil ejected from between the bearing 25' and the washer 27'. This oil collected by the inner wall of the lower end of the pipe 26' can then flow back into the reservoir 31'.

Alternately, the lower driver unit 29 is not necessarily integrated with the lower transmission component 20, 20'. In particular the lower transmission component 20, 20' could be mounted on an inserted lower driver unit.

Alternately, the washer 27, 27' does not necessarily rest directly on the lower transmission component 20, 20', but in particular could rest on an intermediate washer disposed on the lower transmission component 20, 20'.

The present invention is in no way limited to the illustrative embodiment described and to its variants, but encompasses numerous modifications in the scope of the claims.

The invention claimed is:

1. A working container for electrical household food preparation appliances comprising:
    a receptacle having a rotary working tool arranged in the receptacle;
    a shaft having a first end and a second end, the first end of the shaft being connected to the rotary working tool and the second end extending through a bottom of the receptacle;
    a bearing having a first end and a second end, the bearing being arranged in the bottom of the receptacle for rotatably supporting the shaft; and
    a lower transmission component connected by the second end of the shaft to drive the rotary working tool via a lower drive unit, the lower transmission component has an having a body with an annular upper flange ring defining a recessed reservoir between a sidewall of the upper flange ring and the second end of the shaft,
    wherein the second end of the bearing is arranged in the reservoir.

2. The working container as in claim 1, wherein the bearing is housed in a pipe.

3. The working container as in claim 2, wherein the pipe has a lower end surrounding a lower portion of the bearing, the lower end of the pipe extending into the reservoir.

4. The working container as in claim 1, wherein the bearing is made of a sintered metal material.

5. The working container as in claim 1, wherein the bearing rests on a washer.

6. The working container as in claim 1, wherein a seal is mounted on the shaft between the bearing and the rotary working tool.

7. The working container as in claim 6, wherein the seal is a lip seal.

8. The working container as in claim 1, wherein the reservoir has a channel.

9. The working container as in claim 8, wherein the upper flange ring is arranged around a periphery of the channel.

10. The working container as in claim 1, wherein the lower transmission component has outer fins.

11. The working container as in claim 10, wherein the outer fins are arranged around a periphery of the upper flange ring.

12. An electrical household food preparation appliance comprising a base housing a motor associated with an upper driver unit, and a working container comprising a lower transmission component connected by a shaft to a rotary working tool arranged in a receptacle, the shaft running through a bottom of the receptacle and being rotatably mounted in a bearing housed in the bottom of the receptacle, the lower transmission component being rotatably driven by the upper driver unit when the working container is disposed on the base, wherein the working container is configured according to claim 1.

13. The electrical household food preparation appliance as in claim 12, wherein the upper driver unit is directly driven by the motor.

14. The electrical household food preparation appliance as in claim 12, wherein the rotary working tool is rotatably driven at a speed greater than 5000 rpm.

15. A working container for electrical household food preparation appliances comprising:
   a receptacle having a rotary working tool arranged in the receptacle;
   a shaft having a first end and a second end, the first end of the shaft being connected to the rotary working tool and the second end extending through a bottom of the receptacle;
   a bearing having a first end and a second end, the bearing being arranged in a pipe at the bottom of the receptacle for rotatably supporting the shaft; and
   a lower transmission component connected by the second end of the shaft to drive the rotary working tool via a lower drive unit, the lower transmission component having a body with an annular upper flange ring defining a recessed reservoir between a sidewall of the upper flange ring and the second end of the shaft,
   wherein the pipe has a lower end surrounding a lower portion of the bearing, the lower end of the pipe extending into the reservoir.

16. The working container as in claim 15, wherein the bearing is made of a sintered metal material.

17. The working container as in claim 15, wherein the bearing rests on a washer.

18. The working container as in claim 15, wherein a seal is mounted on the shaft between the bearing and the rotary working tool.

19. The working container as in claim 18, wherein the seal is a lip seal.

20. The working container as in claim 15, wherein the reservoir has a channel.

21. The working container as in claim 20, wherein the upper flange ring is arranged around a periphery of the channel.

22. The working container as in claim 15, wherein the lower transmission component has outer fins.

23. The working container as in claim 22, wherein the outer fins are arranged around a periphery of the upper flange ring.

24. An electrical household food preparation appliance comprising a base housing a motor associated with an upper driver unit, and a working container comprising a lower transmission component connected by a shaft to a rotary working tool arranged in a receptacle, the shaft running through a bottom of the receptacle and being rotatably mounted in a bearing housed in the bottom of the receptacle, the lower transmission component being rotatably driven by the upper driver unit when the working container is disposed on the base, wherein the working container is configured according to claim 15.

25. The electrical household food preparation appliance as in claim 24, wherein the upper driver unit is directly driven by the motor.

26. The electrical household food preparation appliance as in claim 24, wherein the rotary working tool is rotatably driven at a speed greater than 5000 rpm.

* * * * *